United States Patent
Kokubun et al.

(10) Patent No.: US 7,242,427 B2
(45) Date of Patent: Jul. 10, 2007

(54) X-Y ADDRESS TYPE SOLID-STATE IMAGE PICKUP DEVICE WITH AN IMAGE AVERAGING CIRCUIT DISPOSED IN THE NOISE CANCEL CIRCUIT

(75) Inventors: Masatoshi Kokubun, Kawasaki (JP); Katsuyosi Yamamoto, Kawasaki (JP); Shinya Udo, Kawasaki (JP); Jun Funakoshi, Kawasaki (JP); Chikara Tsuchiya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 800 days.

(21) Appl. No.: 10/055,901

(22) Filed: Jan. 28, 2002

(65) Prior Publication Data

US 2002/0158982 A1    Oct. 31, 2002

(30) Foreign Application Priority Data

Apr. 26, 2001   (JP)   ............................. 2001-130149

(51) Int. Cl.
*H04N 5/217*    (2006.01)
(52) U.S. Cl. ..................... 348/241; 348/230.1; 348/308
(58) Field of Classification Search ................ 348/308, 348/230.1, 241
See application file for complete search history.

(56) References Cited

U.S. PATENT DOCUMENTS

| | | | |
|---|---|---|---|
| 5,663,555 A | * | 9/1997 | Miyawaki et al. ........ 250/208.1 |
| 5,920,345 A | * | 7/1999 | Sauer ......................... 348/308 |
| 5,926,214 A | | 7/1999 | Denyer et al. |
| 5,949,483 A | * | 9/1999 | Fossum et al. ............. 348/303 |
| 5,969,758 A | | 10/1999 | Sauer et al. |
| 6,166,367 A | * | 12/2000 | Cho ......................... 250/208.1 |

(Continued)

FOREIGN PATENT DOCUMENTS

| | | |
|---|---|---|
| EP | 0 616 464 A2 | 9/1994 |
| JP | 09247535 | 9/1997 |

OTHER PUBLICATIONS

Programmable multiresolution CMOS active pixel sensor Roger Panicacci, Sabrina E. Kemeny, Larry H. Matthies, Bedabrata Pain, and Eric R. Fossum, Proc. SPIE 2654, 72 (1996).*

(Continued)

*Primary Examiner*—Ngoc-Yen Vu
*Assistant Examiner*—Gary C. Vieaux
(74) *Attorney, Agent, or Firm*—Arent Fox LLP

(57) ABSTRACT

The invention relates to an X-Y address type solid-state image pickup device manufactured by a CMOS process, and has an object to provide an X-Y address type solid-state image pickup device in which a chip area is not increased, manufacturing costs are suppressed, and an image averaging processing can be carried out. Pixel regions Pmn are arranged in a matrix form in regions defined by horizontal selection lines RWm and vertical selection lines CLn. Each of the pixel regions Pmn includes a photodiode 10, a source follower amplifier 14 for converting an electric charge of the photodiode 10 into a voltage and amplifying it to output image data, and a horizontal selection transistor 16 for outputting the image data to a predetermined one of the vertical selection lines CLn. An amplifier/noise cancel circuit 6 has a built-in image averaging circuit for carrying out an averaging processing of the image data outputted from at least two of the plurality of the pixel regions Pmn.

13 Claims, 8 Drawing Sheets

U.S. PATENT DOCUMENTS

| | | | |
|---|---|---|---|
| 6,590,198 B1 * | 7/2003 | Zarnowski et al. | 250/214 LS |
| 7,071,980 B2 * | 7/2006 | Yuki et al. | 348/308 |
| 7,154,075 B2 * | 12/2006 | Krymski | 250/208.1 |
| 2004/0246354 A1 * | 12/2004 | Yang et al. | 348/308 |

OTHER PUBLICATIONS

Progress in CMOS active pixel image sensors Sunetra K. Mendis, Sabrina E. Kemeny, Russell C. Gee, Bedabrata Pain, Quiesup Kim, and Eric R. Fossum, Proc. SPIE 2172, 19 (1994).*

* cited by examiner

X-Y ADDRESS TYPE SOLID-STATE IMAGE PICKUP DEVICE WITH AN IMAGE AVERAGING CIRCUIT DISPOSED IN THE NOISE CANCEL CIRCUIT

BACKGROUND OF THE INVENTION

1. Field of the Invention

The present invention relates to a solid-state image pickup device constituted by semiconductor elements, and particularly to an X-Y address type solid-state image pickup device manufactured by a CMOS process.

2. Description of the Related Art

A solid-state image pickup device is roughly classified into a CCD (Charge Coupled Device) solid-state image pickup device constituted by a charge transfer type image sensor, and an X-Y address type solid-state image pickup device in which an image sensor is constituted by, for example, CMOS (Complementary Metal Oxide Semiconductor) transistors. The X-Y address type solid-state image pickup device using a CMOS image sensor (hereinafter suitably abbreviated to a CMOS image sensor) can be manufactured by the same technique as a manufacturing process of a MOSFET, and it is driven by a single power source and has low electric power consumption, and further, various signal processing circuits can be mounted on the same chip. Thus, the CMOS image sensor is regarded as promising in substitution for the CCD solid-state image pickup device.

The CMOS image sensor includes a plurality of pixel regions defined by a plurality of vertical selection lines and horizontal selection lines in a matrix form, and a photoelectric transducer such as a photodiode is formed in each of the pixel regions. Light incident on a light receiving surface of each photoelectric transducer is subjected to photoelectric conversion, and an electric charge is stored in the transducer. The stored electric charge is converted into a voltage by a source follower amplifier provided in the pixel and is amplified, and the voltage is read out as image data of one pixel at a predetermined timing.

As a use mode of the CMOS image sensor, for example, in order to intentionally obtain a rough display resolution, there is a case of executing a processing to decrease the number of image data by carrying out an averaging processing of image data of neighborhood pixels. In the image averaging processing, analog image data of the respective pixels outputted from the CMOS image sensor are converted into digital data by using an A/D (Analog/Digital) converter, and after they are stored in a storage device once, the image data of the neighborhood pixels are averaged by using a logical processing.

However, in the above conventional image averaging processing, there arise a problem as follows: FIG. 11 schematically shows a pixel array of a light receiving surface of the CMOS image sensor. Each pixel is made to correspond to any one of the three primary colors R (Red), G (Green) and B (Blue). For example, in the pixel array shown in FIG. 11, at an odd line (in the horizontal direction), pixels are successively arranged from the left to the right like R, G, R, G, . . . , and at an even line, similarly, pixels are successively arranged like G, B, G, B, . . . . Accordingly, if an attempt is made to obtain one pixel for each of R, G and B by averaging image signals of R, G and B from 4×4=16 pixels surrounded by a broken line in the drawing, in the foregoing image averaging processing, the logical processing becomes extremely complicated, and further, the capacity of the storage device for storing the image data becomes large. Thus, if an attempt is made to incorporate an image averaging circuit in the same chip as the CMOS image sensor, there arises a problem that a chip area is largely increased, and manufacturing costs become high.

SUMMARY OF THE INVENTION

An object of the present invention is to provide an X-Y address type solid-state image pickup device in which a chip area is not increased, manufacturing costs are suppressed, and an image averaging processing can be carried out.

The above object is achieved by an X-Y address type solid-state image pickup device characterized by comprising a plurality of pixel regions arranged in a matrix form, wherein each pixel region including a photoelectric transducer for performing photoelectric conversion of incident light, an amplifier for converting an electric charge stored in the photoelectric transducer into image data, and a horizontal selection switch for outputting the image data to a predetermined one of vertical selection lines on the basis of a horizontal selection signal outputted to a predetermined one of horizontal selection lines, and an image averaging circuit for carrying out an averaging processing of the image data outputted from at least two of the plurality of pixel regions.

BRIEF DESCRIPTION OF THE DRAWINGS

FIG. 11 is a view schematically showing a pixel array of a light receiving surface of a CMOS image sensor.

DETAILED DESCRIPTION OF THE PREFERRED EMBODIMENTS

First Embodiment

Figure 1:
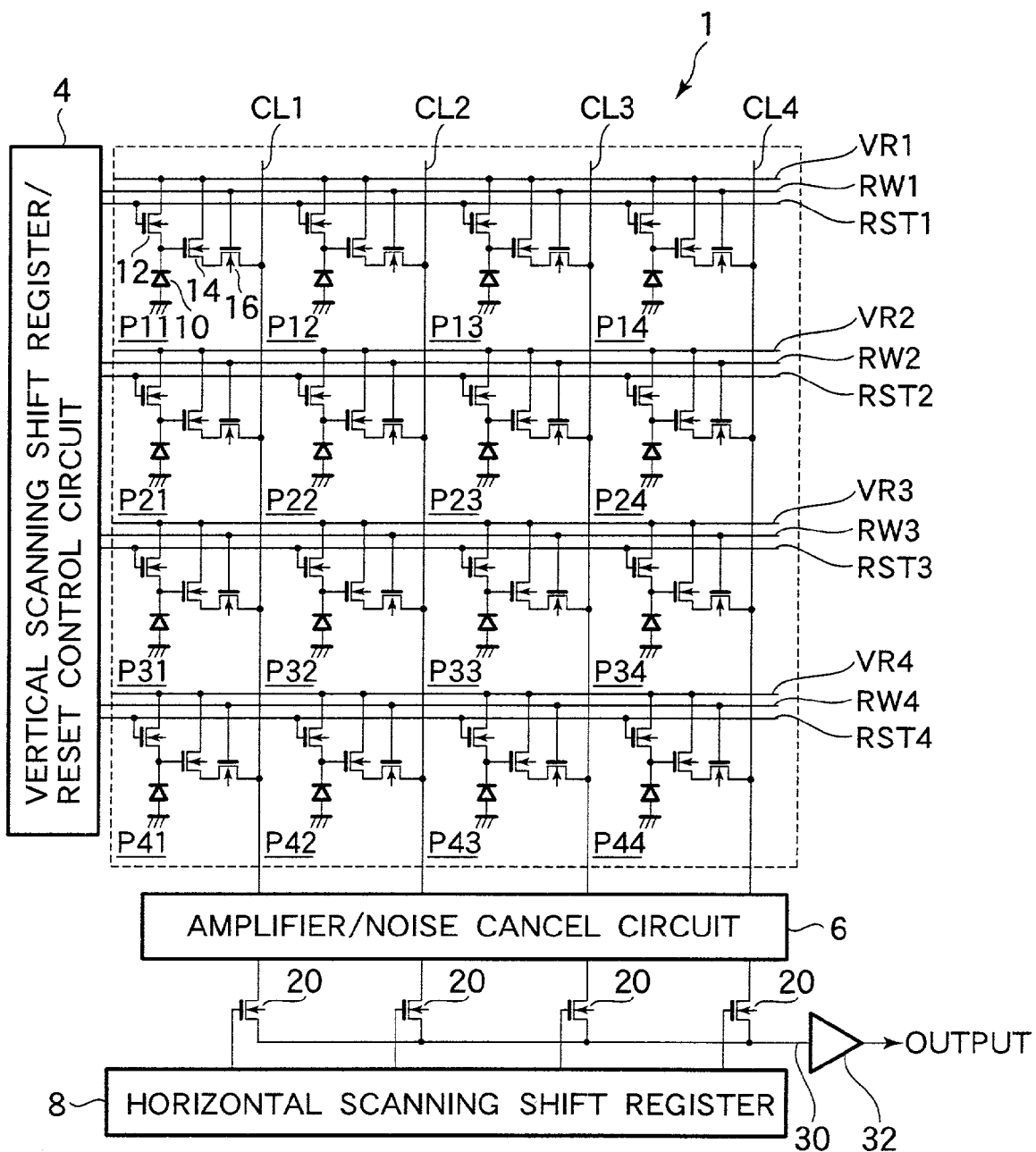
FIG. 1 is a view showing 4×4 pixels of a CMOS image sensor 1 according to a first embodiment of the present invention.

An X-Y address type solid-state image pickup device according to a first embodiment of the present invention will be described with reference to FIGS. 1 to 3. First, a rough structure of a CMOS image sensor as the X-Y address type solid-state image pickup device according to this embodiment will be described with reference to FIG. 1. FIG. 1 shows a circuit example of 4×4 pixels of a CMOS image sensor 1 including a pixel array of m rows and n columns. Pixel regions P11 to P44 defined by a plurality of vertical selection lines CL1 to CL4 and a plurality of horizontal selection lines RW1 to RW4 are arranged in a matrix form. A photodiode 10 as a photoelectric transducer is formed in each of the pixel regions P11 to P44. As the photoelectric transducer, for example, a photo gate may be used instead of the photodiode 10.

The CMOS image sensor 1 has, in each of the pixel regions P11 to P44, an APS(Active Pixcel Sensor) structure in which a source follower amplifier 14 constituted by, for example, a MOSFET (in this embodiment, an n-ch (n-channel) MOSFET is exemplified), a horizontal selection transistor 16, and the like are disposed.

Hereinafter, a row number is made m, a column number is made n, and a circuit structure of a pixel region Pmn will be described. A cathode side of the photodiode 10 in the pixel region Pmn is connected to a source electrode of a reset transistor 12 of, for example, an n-ch MOSFET and a gate electrode of the source follower amplifier 14.

A drain electrode of the reset transistor 12 is connected to a reset voltage supply line VRm to which a reset voltage VR is applied, and its gate electrode is connected to a reset signal line RSTm. A drain electrode of the source follower amplifier 14 is connected to the reset voltage supply line VRm, and its source electrode is connected to a drain electrode of the horizontal selection transistor 16 of, for example, an n-ch MOSFET. A gate electrode of the horizontal selection transistor 16 is connected to the horizontal selection line RWm to which a selection signal is supplied. A source electrode of the horizontal selection transistor 16 is connected to the vertical selection line CLn.

The reset voltage supply line VRm and the horizontal selection line RWm are connected to a vertical scanning shift register/reset control circuit 4. The selection signal is successively outputted to the horizontal selection line RWm at a predetermined timing by a not-shown shift register provided in the vertical scanning shift register/reset control circuit 4.

The vertical selection line CLn is connected to a signal common output line 30 through an amplifier/noise cancel circuit 6 and a column selection transistor 20 of, for example, an n-ch MOSFET. A structure of the amplifier/noise cancel circuit 6 will be described later with reference to FIG. 2. A column selection signal is successively inputted to a gate electrode of the column selection transistor 20 from a horizontal scanning shift register 8 at a predetermined timing, and image data in which a fixed pattern noise is removed by the amplifier/noise cancel circuit 6 is successively outputted to the signal common output line 30 and is transmitted to an external system through an amplifier 32.

Next, the operation of the CMOS image sensor 1 will be described in brief. First, when the reset transistor 12 is turned on at a predetermined timing by a reset signal RST, the photodiode 10 is charged to the reset potential VR. Next, with the incidence of light, the photodiode 10 starts to discharge, and the potential is lowered from the reset potential VR. When a horizontal selection signal RW is outputted to the horizontal selection line RWm after a predetermined time has elapsed, the horizontal selection signal RW is inputted to the gate electrode of the horizontal selection transistor 16 connected to the horizontal selection line RWm, and the horizontal selection transistor 16 is turned on. By this, the output voltage from the source follower amplifier 14 is outputted as the image data of the pixel region Pmn to the vertical selection line CLn.

By the way, in the APS structure in which the charge storage capacitance such as the photodiode 10 and the amplifier such as the source follower amplifier 14 are mounted, there is a problem that a fixed pattern noise (FPN) in which a DC output level is changed by fluctuation of VT (threshold voltage) and the like with respect to the same signal, is generated and picture quality is deteriorated. In order to reduce this FPN, as a noise cancel circuit, for example, a correlated double sampling (CDS) circuit is used in which after a signal voltage of the image data is sampled, the photodiode 10 is reset to the reset potential VR, the reset voltage is sampled, and a difference between the signal voltage and the reset voltage is obtained, so that the FPN component is cancelled.

Here, a correlated double sampling circuit will be described in brief. FIG. 2 shows a structure of a sample-and-hold circuit and a correlated double sampling circuit connected to the vertical selection line CL1. In FIG. 2, a block indicated by a broken line at the left side in the drawing shows the pixel region P11 at the upper left of FIG. 1 as an example of the plurality of pixels connected to the vertical selection line CL1. A block indicated by a broken line at the right side in the drawing shows the sample-and-hold circuit and the correlated double sampling circuit. The sample-and-hold circuit is provided with a sample-holding switch 42 for controlling the input of a signal outputted to the vertical selection line CL1. A constant current source 40 is connected to a connection point between an input side of the sample-holding switch 42 and the vertical selection line CL1. One electrode side of a sample-holding capacitance 44 for holding the signal outputted to the vertical selection line CL1 is connected to an output side of the sample-holding switch 42. A reference voltage source 46 is connected to the other electrode side of the sample-holding capacitance 44.

An input terminal of an amplifier 48 constituting the correlated double sampling circuit is connected to a connection point between the sample-holding switch 42 and the sample-holding capacitance 44. An output terminal of the amplifier 48 is connected to one electrode side of a CDS capacitance 50 of the correlated double sampling circuit, and the other electrode side of the CDS capacitance 50 is connected to an input terminal of an amplifier 54.

The other electrode side of the CDS capacitance 50 is connected to the other electrode side of the sample-holding capacitance 44 through a clamp switch 52. The other electrode side of the CDS capacitance 50 can be fixed to the reference voltage of the reference voltage source 46 by closing the clamp switch 52, and the CDS capacitance 50 can be made to have a floating state by opening the clamp switch 52. An output terminal of the amplifier 54 is connected to the signal common output line 30 through the column selection transistor 20.

Next, the operation of the sample-and-hold circuit and the correlated double sampling circuit will be described with reference to FIG. 2. First, the flow of a signal outputted from the pixel region P11 will be described in brief. When the horizontal selection signal RW1 is inputted to the gate electrode of the horizontal selection transistor 16, a voltage variation of the source follower amplifier 14 corresponding to the electric charge quantity stored by the photodiode 10 of the pixel region P11 is outputted as a signal voltage VS including the image data to the vertical selection line CL1. Next, the reset signal RST is inputted to the gate electrode of the reset transistor 12 while the horizontal selection transistor 16 maintains the on state, so that the reset transistor 12 is brought into the on state and the photodiode 10 is reset to the reset potential VR, and the reset voltage VR is outputted to the vertical selection line CL1. The above operation is carried out in a horizontal blanking period.

In the above flow of the signal, for example, at the timing that the horizontal selection signal RW1 is inputted and the horizontal selection transistor 16 is brought into the on state, the sample-holding switch 42 and the clamp switch 52 are brought into the on state. By this, the signal voltage VS is applied to the input terminal of the sample-and-hold circuit. Since the clamp switch 52 is in the on state, the signal voltage VS charges the sample-holding capacitance 44 of the sample-and-hold circuit and also charges the CDS capacitance 50.

Next, after the clamp switch 52 is turned off, the reset signal RST is inputted to bring the reset transistor 12 into the on state. By this, the photodiode 10 is reset to the reset potential VR, and the reset voltage VR is outputted to the vertical selection line CL1. The reset voltage VR is inputted to the input terminal of the sample-and-hold circuit and is held by the sample-holding capacitance 44.

As a result, a difference signal (VS-VR) corresponding to a difference between the signal voltage VS and the reset voltage VR is generated at the output side of the CDS capacitance 50. This signal is held by the CDS capacitance 50. By doing so, it is possible to obtain the analog image data in which the fixed pattern noise components superimposed on both the signal voltage VS and the reset voltage VR are removed. The analog image data is outputted to the signal common output line 30 from the output terminal of the amplifier 54 through the column selection transistor 20.

In the amplifier/noise cancel circuit 6 of this embodiment, the sample-and-hold circuit and the correlated double sampling circuit (hereinafter, a combination of both the circuits is called a CDS circuit) 6CLn are provided for each vertical selection line CLn. Further, in the CDS circuit 6CLn of this embodiment, there is provided a circuit which uses the CDS capacitance 50 in the correlated double sampling circuit to average analog image data of at least two pixels arranged in a direction in which the horizontal selection line RWm extends.

Hereinafter, an image averaging circuit according to this embodiment will be described with reference to FIG. 3. First, as shown in FIG. 1 and FIG. 11, a description will be given of, as an example, a case where for example, pixel regions corresponding to R (Red) are P11 and P13, and image data of these pixel regions P11 and P13 are subjected to an averaging processing.

Figure 2:
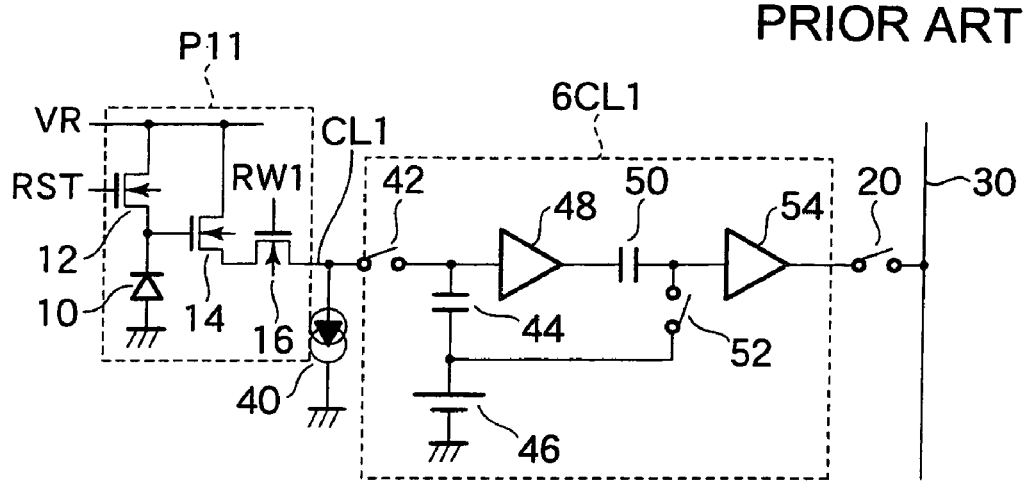
FIG. 2 is a view showing a circuit example of a sample-and-hold circuit and a correlated double sampling circuit of the CMOS image sensor 1 according to the first embodiment of the present invention.
Figure 3:
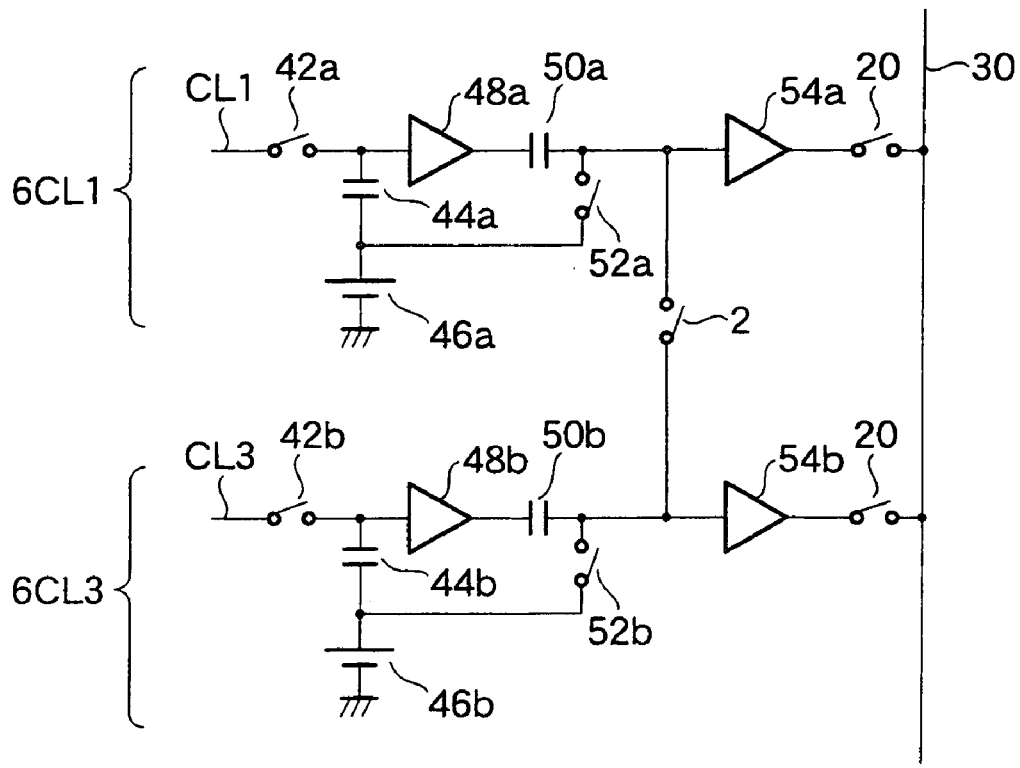
FIG. 3 is a view showing an image averaging circuit of the CMOS image sensor 1 according to the first embodiment of the present invention.

In FIG. 3, the upper stage of the circuit shows the CDS circuit 6CL1 connected to the first column vertical selection line CL1 including the pixel region P11, and the lower stage of the circuit shows the CDS circuit 6CL3 connected to the third column vertical selection line CL3 including the pixel region P13. Although the circuit structures of the CDS circuits 6CL1 and 6CL3 are the same as that shown in FIG. 2, for facilitating the explanation, a subscript "a" is added to a structural element of the CDS circuit 6CL1 and a subscript "b" is added to a structural element of the CDS circuit 6CL3.

As shown in FIG. 3, a connection point between a CDS capacitance 50*a* and an amplifier 54*a* of the CDS circuit 6CL1 can be electrically short-circuited to or disconnected from a connection point between a CDS capacitance 50*b* and an amplifier 54*b* of the CDS circuit 6CL3 through an averaging processing switch 2. Like this, the CMOS image sensor 1 according to this embodiment has the structure in which a predetermined number of CDS circuits 6CLn are connected to each other through the averaging processing switch 2.

Next, the averaging processing operation of the analog image data according to this embodiment will be described. Since the photoelectric conversion operation in the pixel region Pmn, the subsequent sampling of the signal voltage VS and the reset voltage VR, and the operation of canceling the fixed pattern noise are the same as those described with reference to FIG. 2, the description is omitted.

First, the averaging processing switch 2 is set to have the off state. The electric charge corresponding to the image data of the pixel region P11 is stored in the CDS capacitance 50*a* of the CDS circuit 6CL1 after the end of the noise cancel operation. On the other hand, the electric charge corresponding to the image data of the pixel region P13 is stored in the CDS capacitance 50*b* of the CDS circuit 6CL3.

In the case where the averaging processing of the image data is not carried out, while the averaging processing switch 2 maintains the off state, the column selection transistor 20 is successively brought into the on state by receiving the column selection signal from the horizontal scanning shift register 8, and n pieces of analog pixel data of one row are successively outputted to the signal common output line 30.

In the case where the averaging processing of the image data is carried out, the averaging processing switch 2 is changed into the on state before the output of the column selection signal from the horizontal shift register 8 is started. By doing so, the connection point between the CDS capacitance 50*a* and the amplifier 54*a* of the CDS circuit 6CL1 is electrically short-circuited to the connection point between the CDS capacitance 50*b* and the amplifier 54*b* of the CDS circuit 6CL3, and the electric charge stored in the CDS capacitance 50*a* and the electric charge stored in the CDS capacitance 50*b* are averaged. Incidentally, the respective structural elements of the CDS circuits 6CL1 and 6CL3 have almost the same characteristics, and especially, the capacitances of the two CDS capacitances 50*a* and 50*b* are made almost identical to each other. By this, an accurate average value of the image data of the pixel region P11 and the image data of the pixel region P13 can be obtained.

When the image averaging circuit of this embodiment is constructed by successively preparing a set of x pixel regions P of the same color in, for example, the extending direction of the horizontal selection line RWm, the number of image data of the CMOS image sensor 1 provided with, for example, the pixel array of the light receiving surface shown in FIG. 11 can be decreased by a factor of 1/x.

Since x is equal to 2 in the structure of the embodiment shown in FIG. 3, the number of image data can be decreased by a factor of ½. In this case, the horizontal scanning shift register 8 may be operated at a clock frequency of ½ of a normal operation. Besides, in FIG. 3, the image data which has been subjected to the averaging processing and is outputted to the signal common output line 30 may turn on the column selection transistor 20 of either one of the two vertical selection lines CL1 and CL3, or may turn on both the column selection transistors 20 at the same time.

Second Embodiment

Next, an X-Y address type solid-state image pickup device according to a second embodiment of the present invention will be described with reference to FIG. 4. The X-Y address type solid-state image pickup device according to this embodiment has a similar structure to the CMOS image sensor of the first embodiment except for a structure of an image averaging circuit. Structural elements having the same operation and function as those of the first embodiment are designated by the same symbols and their description is omitted.

Figure 4:
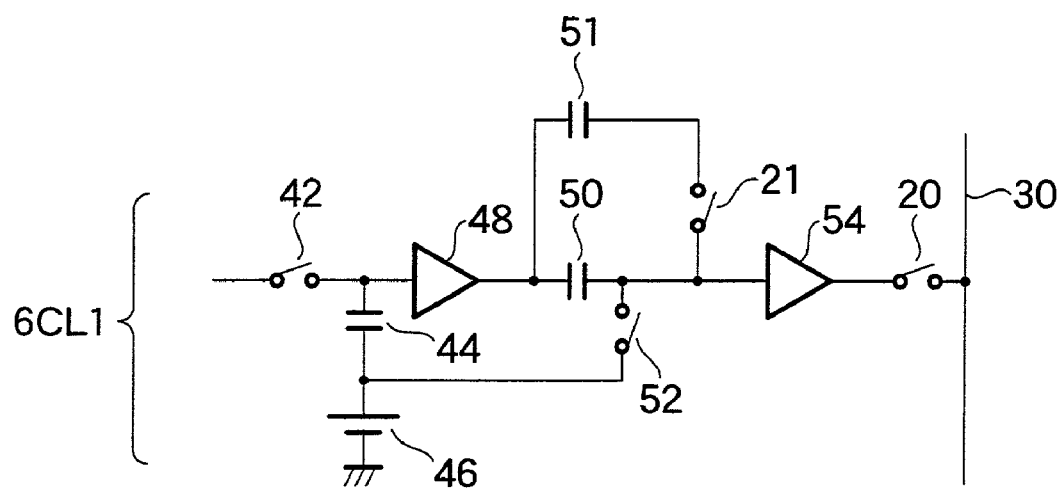
FIG. 4 is a view showing an image averaging circuit of a CMOS image sensor 1 according to a second embodiment of the present invention.

FIG. 4 shows the image averaging circuit according to this embodiment. A CDS circuit 6CLn according to this embodiment is provided with a circuit for averaging analog image data of at least two pixels arranged in the direction of the extension of a vertical selection line CLn. First, a description will be given of, as an example, a case where for example, pixel regions arranged in the direction of the extension of the vertical selection line CL1 and corresponding to R (Red) are P11 and P31, and image data of these pixel regions P11 and P31 are subjected to the averaging processing.

The CDS circuit 6CL1 shown in FIG. 4 is characterized in that a second CDS capacitance 51 is provided in parallel with a CDS capacitance 50, and an averaging processing switch 21 is provided at a connection point between the second CDS capacitance 51 and an amplifier 54.

An image averaging processing operation in the CDS circuit 6CL1 according to this embodiment will be described. First, the averaging processing switch 21 is set to have the on state. The electric charge corresponding to the image data of the pixel region P11 is stored in both the CDS capacitance 50 and the second CDS capacitance 51 of the CDS circuit 6CL1 after the end of the noise cancel operation.

Next, the averaging processing switch 21 is turned off to bring the second CDS capacitance 51 into the floating state to hold the electric charge of the pixel region P11, and then, the electric charge corresponding to the image data of the pixel region P31 is stored in the CDS capacitance 50. Incidentally, in this embodiment, the averaging processing of image data is not carried out for the pixel region P21 (for G) existing between the pixel region P11 and the pixel region P31, and the electric charge of the pixel region P21 is stored in the CDS capacitance 50, and then, is outputted to the signal common output line 30 through the amplifier 54 and the column selection transistor 20.

Now, when the electric charge of the pixel region P31 is stored in the CDS capacitance 50, the averaging processing switch 21 is changed into the on state before the output of the column selection signal from the horizontal scanning shift register 8 is started. By doing so, the electric charge of the pixel region P31 stored in the CDS capacitance 50 and the electric charge of the pixel region P11 stored in the second CDS capacitance 51 are averaged. Incidentally, the capacitance values of the CDS capacitance 50 and the second CDS capacitance 51 are almost identical to each other. By this, an accurate average value of the image data of the pixel region P11 and the image data of the pixel region P31 can be obtained.

In the structure shown in FIG. 4, although only one pair (for R) of the second CDS capacitance 51 and the averaging processing switch 21 is used, a pair (for G) of a third CDS capacitance (not shown) connected in parallel with the CDS capacitance 50 and the second CDS capacitance 51 and an averaging processing switch (not shown) provided at a connection point between the third CDS capacitance and the amplifier 54 may be further added to the CDS circuit 6CL1. By doing so, with respect to all pixels of (R) and (G) on the vertical selection line CL1, image data of every other pixel are averaged, and the display resolution can be reduced by a factor of ½.

Incidentally, in the case where the averaging processing of the image data is not carried out, if the averaging processing switch 21 is always made to have the off state, substantially the same structure and operation as the CDS circuit 6CLn shown in FIG. 2 are obtained, so that m pieces of analog pixel data of one column can be outputted to the signal common output line 30 in one frame period by receiving the row selection signal from the vertical scanning shift register/reset control circuit 4.

Third Embodiment

Next, an X-Y address type solid-state image pickup device according to a third embodiment of the present invention will be described with reference to FIG. 5. The X-Y address type solid-state image pickup device according to this embodiment has a similar structure to the CMOS image sensor 1 of the second embodiment except for a structure of an image averaging circuit. Structural elements having the same operation and function as the second embodiment are designated by the same symbols and their description is omitted.

Figure 5:
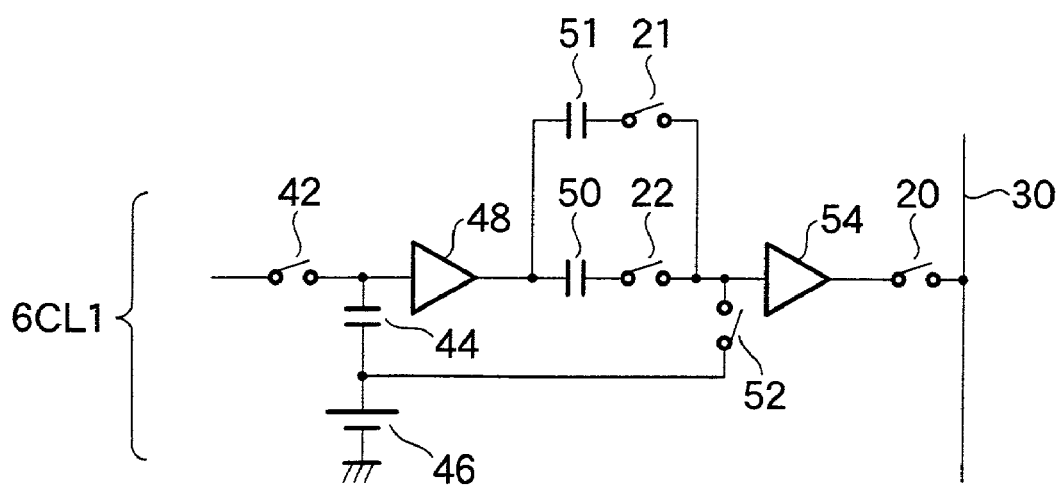
FIG. 5 is a view showing an image averaging circuit of a CMOS image sensor 1 according to a third embodiment of the present invention.

FIG. 5 shows an image averaging circuit according to this embodiment. A CDS circuit 6CL1 shown in FIG. 5 is characterized in that an averaging processing switch 22 is added to a connection point between a CDS capacitance 50 and an amplifier 54 in the structure of the second embodiment shown in FIG. 4.

An image averaging processing operation in the CDS circuit 6CL1 according to this embodiment will be described. First, only the averaging processing switch 22 is brought into the on state from the state where both the averaging processing switches 21 and 22 are in the off state. By this, the electric charge corresponding to the image data of the pixel region P11 is stored in the CDS capacitance 50 of the CDS circuit 6CL1 after the end of the noise cancel operation.

Next, the averaging processing switch 22 is turned off, and the CDS capacitance 50 is brought into the floating state to hold the electric charge of the pixel region P11. Next, the averaging processing switch 21 is brought into the on state. By this, the electric charge corresponding to the pixel data of the pixel region P31 is stored in a second CDS capacitance 51 of the CDS circuit 6CL1 after the end of the noise cancel operation. Incidentally, in this embodiment, the averaging processing of image data is not carried out for the pixel region P21 (for G) existing between the pixel region P11 and the pixel region P31, and the electric charge of the pixel region P21 is stored in the CDS capacitance 50, and then, is outputted to the signal common output line 30 through the amplifier 54 and the column selection transistor 20.

In the case where the averaging processing of the image data is carried out, both the averaging processing switches 21 and 22 are changed into the on state before the output of the column selection signal from the horizontal scanning shift register 8 is started. By doing so, the electric charge of the pixel region P11 stored in the CDS capacitance 50 and the electric charge of the pixel region P31 stored in the second CDS capacitance 51 are averaged, and an accurate average value of the image data of the pixel region P11 and the image data of the pixel region P31 can be obtained.

Also in this embodiment, similarly to the second embodiment, a pair (for G) of a third CDS capacitance and an averaging processing switch (both are not shown) maybe naturally added to the CDS circuit 6CL1, and in the case where the averaging processing of image data is not carried out, either one of the averaging processing switches 21 and 22 has only to be made to always have the off state.

According to this embodiment, since the averaging processing switches 21 and 22 having almost the same switching characteristics are provided at both the side of the CDS capacitance 50 and the side of the second CDS capacitance 51, as compared with the case where the averaging processing switch is disposed only at one side as shown in FIG. 4, deterioration of an image averaging signal by a switching noise or the like can be prevented.

Fourth Embodiment

Next, an X-Y address type solid-state image pickup device according to a fourth embodiment of the present invention will be described with reference to FIG. 6. The X-Y address type solid-state image pickup device according to this embodiment has a similar structure to the CMOS image sensor 1 of the foregoing embodiment except for a structure of an image averaging circuit. Structural elements having the same operation and function as the foregoing embodiment are designated by the same symbols and their description is omitted.

Figure 6:
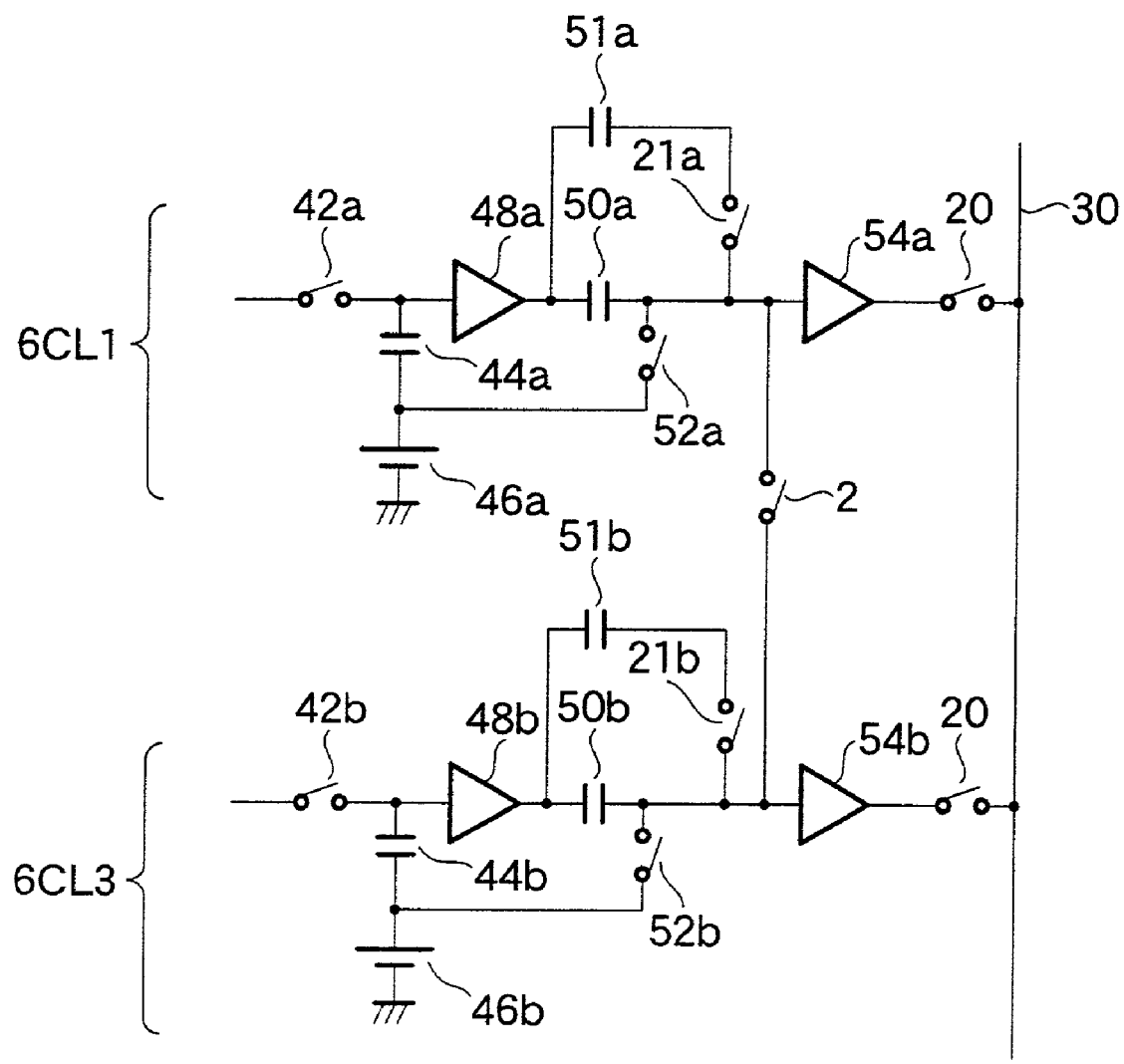
FIG. 6 is a view showing an image averaging circuit of a CMOS image sensor 1 according to a fourth embodiment of the present invention.

FIG. 6 shows the image averaging circuit according to this embodiment. In FIG. 6, the upper stage of the circuit shows, as an example, a CDS circuit 6CL1 connected to a first column vertical selection line CL1 including a pixel region P11, and the lower stage of the circuit shows, as an example, a CDS circuit 6CL3 connected to vertical selection line CL3 including a pixel region P13. Although the circuit structures of the CDS circuit 6CL1 and 6CL3 are the same as that shown in FIG. 4, for facilitating the explanation, a subscript "a" is added to a structural element of the CDS circuit 6CL1 and a subscript "b" is added to a structural element of the CDS circuit 6CL3.

As shown in FIG. 6, a connection point between a CDS capacitance 50a and an amplifier 54a of the CDS circuit 6CL1 is electrically connected to a connection point between a CDS capacitance 50b and an amplifier 54b of the CDS circuit 6CL3 through an averaging processing switch 2. Like this, the CMOS image sensor 1 according to this embodiment has basically the structure shown in FIG. 3, and the portion of the CDS capacitance is replaced by the structure of FIG. 4.

Next, an averaging processing operation of analog image data according to this embodiment will be described. First, the averaging processing switch 2 is set to have the off state, and averaging processing switches 21a and 21b are set to have the on state. The electric charge corresponding to the image data of the pixel region P11 is stored in a second CDS capacitance 51a of the CDS circuit 6CL1 after the end of the noise cancel operation. On the other hand, the electric charge corresponding to the image data of the pixel region P13 is stored in a second CDS capacitance 51b of the CDS circuit 6CL3.

Next, the averaging processing switches 21a and 21b are set to have the off state, and the second CDS capacitances 51a and 51b are brought into the floating state to respectively hold the electric charges of the pixel regions P11 and P13.

Next, when the noise cancel operation to the pixel signal of the third horizontal selection line RW3 is ended subsequently to the noise cancel operation to the pixel signal of the second horizontal selection line RW2, the electric charge corresponding to the image data of the pixel region P31 is stored in the CDS capacitance 50a. On the other hand, the electric charge corresponding to the image data of the pixel region P33 is stored in the CDS capacitance 50b.

Next, the averaging processing switches 21a and 21b are brought into the on state. When the averaging processing switch 21a is turned on, the electric charge of the pixel region P31 stored in the CDS capacitance 50a of the CDS circuit 6CL1 and the electric charge of the pixel region P11 stored in the second CDS capacitance 51a are averaged, and an accurate average value a of the image data of the pixel region P11 and the image data of the pixel region P31 can be obtained.

On the other hand, when the averaging processing switch 21b is turned on, the electric charge of the pixel region P33 stored in the CDS capacitance 50b of the CDS circuit 6CL3 and the electric charge of the pixel region P13 stored in the second CDS capacitance 51b are averaged, and an accurate average value β of the image data of the pixel region P13 and the image data of the pixel region P33 can be obtained.

Next, when the averaging processing switch 2 is brought into the on state, an average of the average value a and the average value β is obtained. By this, the four image data of the (R) pixel regions P11, P13, P31 and P33 are averaged. The above image averaging operation is carried out before the output of the column selection signal from the horizontal scanning shift register 8 is started. Incidentally, in the above, although a time difference is provided in the switching operation of the averaging processing switches 2, 21a, and 21b and the description has been made in sequence, it is not necessary to provide the time difference, and the four image data can be subjected to the averaging processing at the same time by bringing the averaging processing switches 2, 21a and 21b into the on state at the same time.

Besides, the image data which has been subjected to the averaging processing and is outputted to the signal common output line 30 may turn on the column selection transistor 20 of either one of the two vertical selection lines CL1 and CL3, or may turn on both the column selection transistors 20 at the same time. Incidentally, in the case where the averaging processing of the image data is not carried out, the averaging processing switches 2, 21a and 21b have only to be made to maintain the off state.

According to this embodiment, when the image averaging circuit is constructed by successively preparing a set of x pixel regions P of the same color in, for example, the extending direction of the horizontal selection line RWm, the number of image data of the CMOS image sensor 1 provided with, for example, i the pixel array of the light receiving surface shown in FIG. 11 can be decreased by a factor of 1/x in the extending direction of the horizontal selection line RWm.

Besides, in each of the CDS circuits 6CL1 and 6CL3 shown in FIG. 6, although only one pair of the second CDS capacitance 51a, 51b and the averaging processing switch 21a, 21b (for R) is used, a pair (for G or for B) of a third CDS capacitance and an averaging processing switch (both are not shown) may be further added. By doing so, with respect to all pixels of (R), (G) and (B) on the vertical selection line CLn, the image data of every other pixel are averaged, and the number of image data can be decreased by a factor of ½ in the extending direction of the vertical selection line CLn. Accordingly, the display resolution of all the light receiving surface exemplified in FIG. 11 can be reduced by a factor of 1/(2x). In this case, the horizontal scanning shift register 8 maybe suitably operated at a clock frequency of 1/(2x) of a normal operation.

Fifth Embodiment

Next, an X-Y address type solid-state image pickup device according to a fifth embodiment of the present invention will be described with reference to FIGS. 7 to 9. The X-Y address type solid-state image pickup device according to this embodiment has a similar structure to the CMOS image sensor 1 of the fourth embodiment shown in FIG. 6 except for a structure of an image averaging circuit. Structural elements having the same operation and function as those of the foregoing embodiment are designated by the same symbols and their description is omitted.

Figure 7:
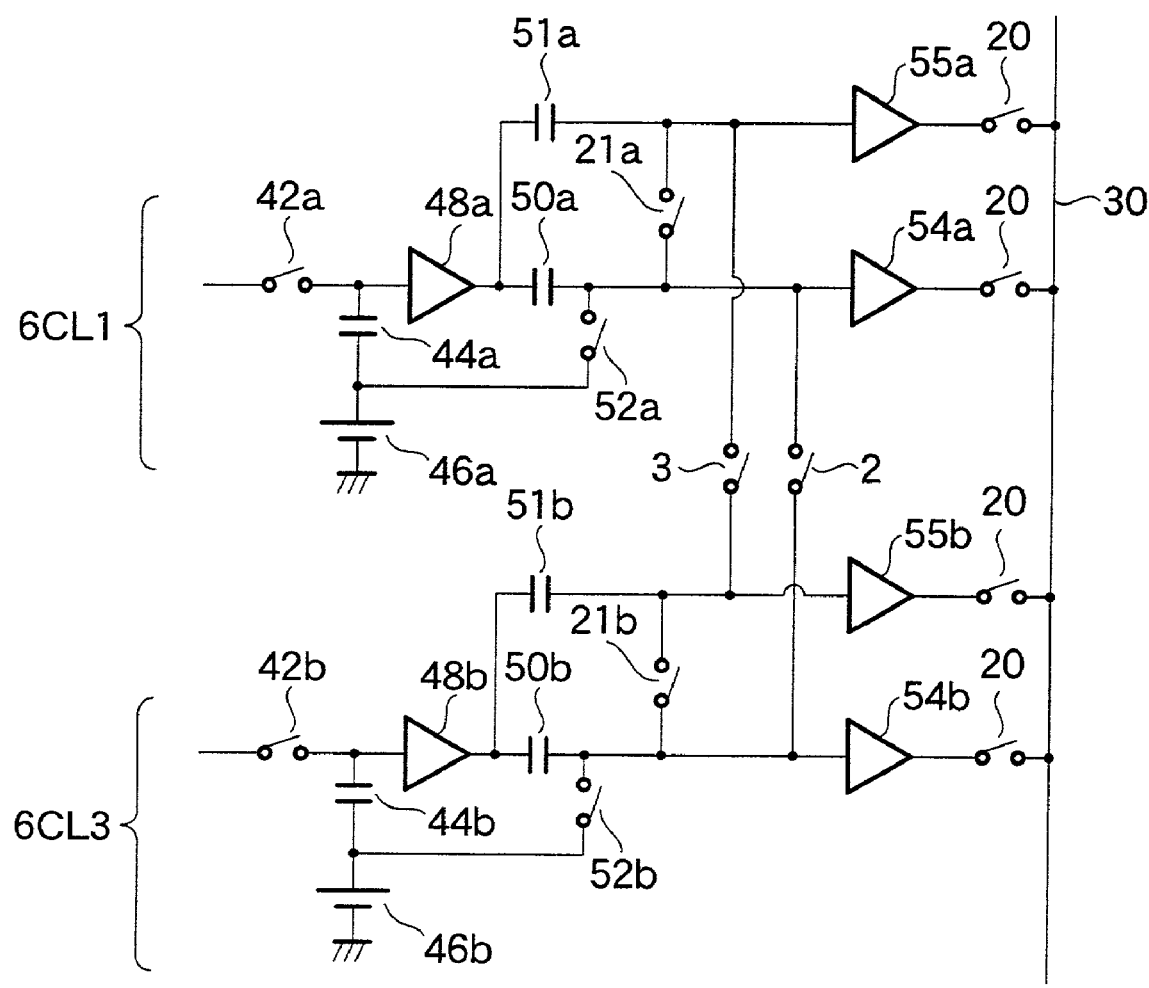
FIG. 7 is a view showing an image averaging circuit of a CMOS image sensor 1 according to a fifth embodiment of the present invention.

FIG. 7 shows an image averaging circuit according to this embodiment. As shown in FIG. 7, an input terminal of an amplifier 55*a* is connected to a connection point between a second CDS capacitance 51*a* and an averaging processing switch 21*a* of a CDS circuit 6CL1. Besides, an input terminal of an amplifier 55*b* is connected to a connection point between a second CDS capacitance 51*b* and an averaging processing switch 21*b* of a CDS circuit 6CL3. Output terminals of the amplifiers 55*a* and 55*b* are connected to a signal common output line 30 through column selection transistors 20 provided at the respective output terminals. Correspondingly to an averaging processing switch 2 provided between a connection point between a CDS capacitance 50*a* and an amplifier 54*a* and a connection point between a CDS capacitance 50*b* and an amplifier 54*b*, an averaging processing switch 3 is formed also between a connection point between the second CDS capacitance 51*a* and the amplifier 55*a* and a connection point between the second CDS capacitance 51*b* and the amplifier 55*b*.

According to this embodiment, the amplifiers 54*a*, 54*b*, 55*a* and 55*b* having almost the same element characteristics and the column selection transistors 20 are respectively provided for both the side of the CDS capacitances 50*a* and 50*b* and the side of the second CDS capacitances 51*a* and 51*b*. By adopting the circuit structure like this, all parasitic capacitances added to the switching elements and the connection points of the amplifiers can be made to have the same value.

In order to accurately average the electric charges stored in the CDS capacitances 50*a* and 50*b* and the second CDS capacitances 51*a* and 51*b*, capacitance values of a plurality of signal transfer systems are required to become almost identical in any systems. According to this embodiment, not only the CDS capacitances 50*a* and 50*b* and the second CDS capacitances 51*a* and 51*b* have the same capacitance, but also all parasitic capacitances added to them can be made equal to one another, so that it becomes possible to average the capacitance electric charges with high accuracy.

Next, an averaging processing operation of analog image data according to this embodiment will be described. First, the averaging processing switches 2 and 3 are set to have the off state, and the averaging processing switches 21*a* and 21*b* are set to have the on state. The electric charge of the pixel region P11 is stored in the second CDS capacitance 51*a* of the CDS circuit 6CL1 after the end of the noise cancel operation. On the other hand, the electric charge of the pixel region P13 is stored in the second CDS capacitance 51*b* of the CDS circuit 6CL3.

Next, the averaging processing switches 21*a* and 21*b* are set to have the off state, and the second CDS capacitances 51*a* and 51*b* are brought into the floating state so that the electric charges of the pixel regions P11 and P13 are respectively held.

Next, when the noise cancel operation to the pixel signal of the third horizontal selection line RW3 is ended subsequently to the noise cancel operation to the pixel signal of the second horizontal selection line RW2, the electric charge of the pixel region P31 is stored in the CDS capacitance 50*a*. On the other hand, the electric charge of the pixel region P33 is stored in the CDS capacitance 50*b*.

Next, all the averaging processing switches 2, 3, 21*a* and 21*b* are brought into the on state at the same time. By this, the electric charge of the pixel region P31 stored in the CDS capacitance 50*a* of the CDS circuit 6CL1, the electric charge of the pixel region P11 stored in the second CDS capacitance 51*b*, the electric charge of the pixel region P33 stored in the CDS capacitance 50*b* of the CDS circuit 6CL3, and the electric charge of the pixel region P13 stored in the second CDS capacitance 51*b* are averaged, and four image data of the (R) pixel regions P11, P13, P31 and P33 are averaged. The above image averaging operation is carried out before the output of the column selection signal from the horizontal scanning shift register 8 is started. Incidentally, in the case where the averaging processing of the image data is not carried out, the averaging processing switches 2, 3, 21*a* and 21*b* have only to be made to maintain the off state.

Also in this embodiment, similarly to the fourth embodiment, the number of image data of the CMOS image sensor 1 provided with, for example, the pixel array of the light receiving surface shown in FIG. 11 can be decreased by a factor of 1/x in the extending direction of the horizontal selection line RWm. Besides, by adding a pair (for G or for B) of a third CDS capacitance and an averaging processing switch, the number of image data can be decreased by a factor of ½ in the extending direction of the vertical selection line CLn. Accordingly, it becomes possible to reduce the display resolution of the whole light receiving surface by a factor of 1/(2x).

Figure 8:
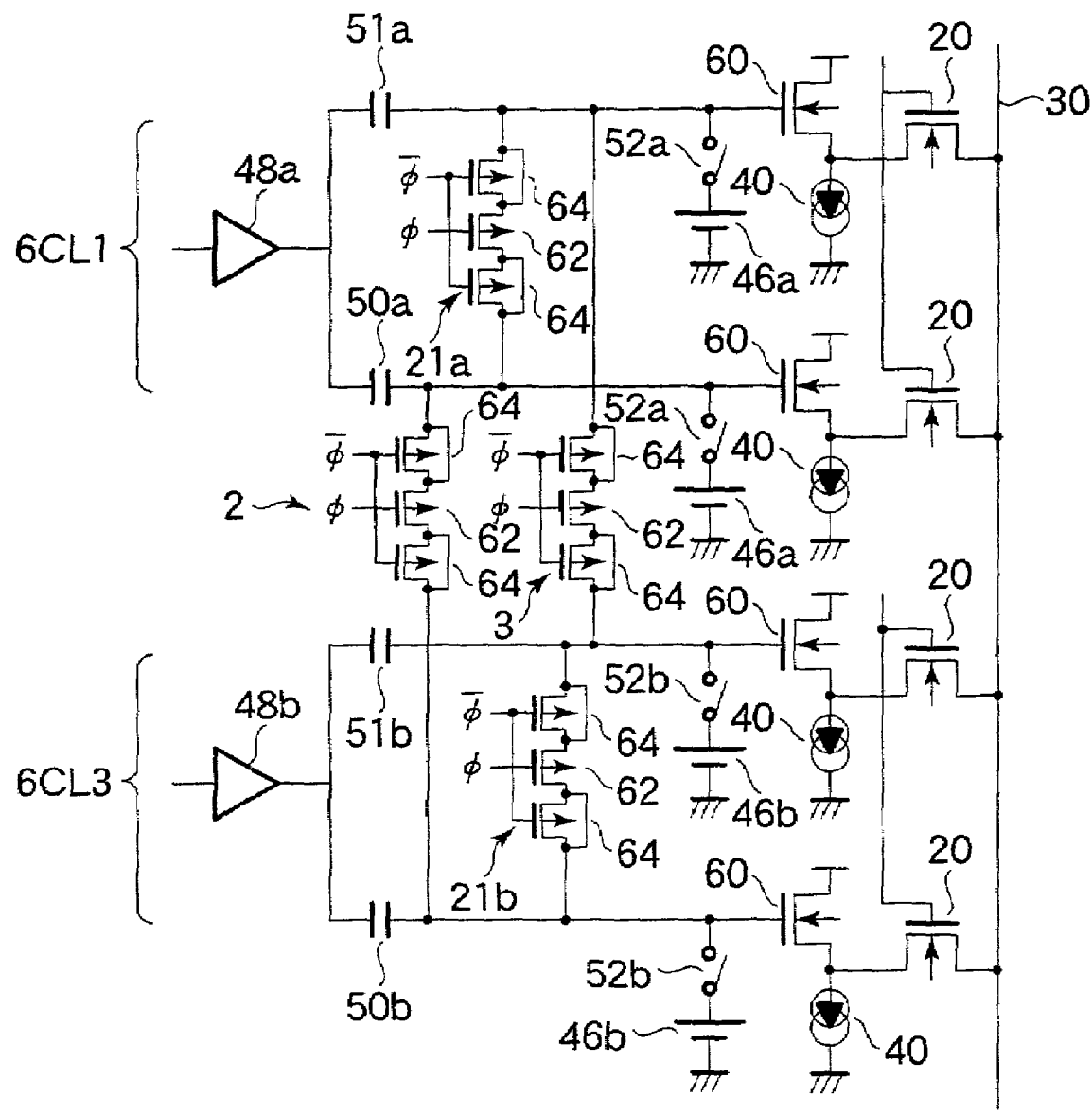
FIG. 8 is a view showing a specific circuit example of the image averaging circuit of the CMOS image sensor 1 according to the fifth embodiment of the present invention.

FIG. 8 shows the image averaging circuit of FIG. 7 more specifically. In FIG. 8, each of the amplifiers 54*a*, 54*b*, 55*a* and 55*b* is a source follower amplifier using a constant current source 40 and an n-ch MOSFET 60, and the column selection transistor 20 is constituted by an n-ch MOSFET.

Besides, the respective switches for averaging the capacitance charges are constituted by only p-ch MOSFETs. In FIG. 8, each of the averaging processing switches 2, 3, 21*a* and 21*b* includes an analog switch circuit 62 of a p-ch MOSFET. A noise cancel circuit 64 made of a p-ch MOSFET is connected to each of a source electrode and a drain electrode of the p-ch MOSFET of the analog switch circuit 62. In the p-ch MOSFET of the noise cancel circuit 64, its source/drain electrodes are short-circuited, and its element size is formed to be about ½ of the size of the p-ch MOSFET of the analog switch 62. A control signal of a predetermined voltage is applied to a gate electrode of the p-ch MOSFET of the analog switch circuit 62, and a control signal/φ ("/" denotes reverse polarity) of a polarity reverse to the control signal φ is applied to a gate electrode of the p-ch MOSFET of the noise cancel circuit 64.

By this, a noise component caused by the gate input capacitance of the input terminal side of the p-ch MOSFET of the analog switch circuit 62 is cancelled by a capacitance component of the p-ch MOSFET of the noise cancel circuit 64 connected to the input terminal side of the analog switch 62. Besides, a noise component caused by the gate input capacitance of the output terminal side of the p-ch MOSFET of the analog switch 62 is cancelled by a capacitance component of the p-ch MOSFET of the noise cancel circuit 64 connected to the output terminal side of the analog switch 62.

Figure 9:
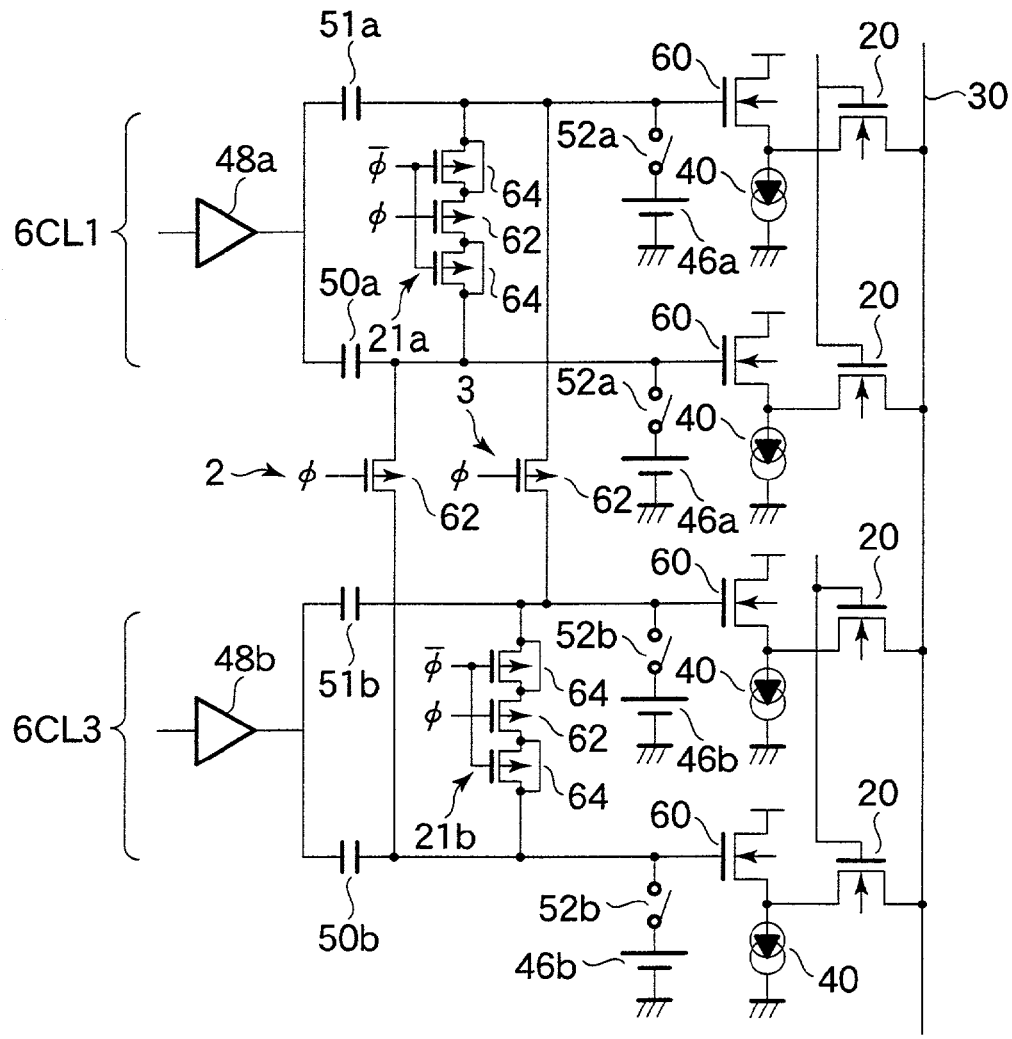
FIG. 9 is a view showing another specific circuit example of the image averaging circuit of the CMOS image sensor 1 according to the fifth embodiment of the present invention.

FIG. 9 shows a modified example of the image averaging circuit shown in FIG. 8. The image averaging circuit shown in FIG. 9 has the same structure except that the noise cancel circuits 64 are removed from the averaging processing switches 2 and 3 shown in FIG. 8 to leave only the analog switch circuits 62.

In the image averaging circuit shown in FIG. 9, when image data of four pixels are subjected to the averaging processing, as already explained, all averaging processing switches 2, 3, 21a and 21b are turned on at the same time. Accordingly, a noise component caused by a gate input capacitance of one terminal side of a p-ch MOSFET of an analog switch circuit 62 of the averaging processing switch 2 can be cancelled by a capacitance component of a p-ch MOSFET of a noise cancel circuit 64 connected to one terminal side of an analog switch circuit 62 of the averaging processing switch 21a.

Similarly, a noise component caused by a gate input capacitance of the other terminal side of the p-ch MOSFET of the averaging processing switch 2 can be cancelled by a noise cancel circuit 64 of one terminal side of the averaging processing switch 21b.

Besides, a noise component caused by a gate input capacitance of one terminal side of a p-ch MOSFET of an analog switch circuit 62 of the averaging processing switch 3 can be cancelled by a capacitance component of a p-ch MOSFET of a noise cancel circuit 64 connected to the other terminal side of the analog switch circuit 62 of the averaging processing switch 21b.

Similarly, a noise component caused by a gate input capacitance of the other terminal side of the p-ch MOSFET of the averaging processing switch 3 can be cancelled by a noise cancel circuit 64 of the other terminal side of the averaging processing switch 21a.

Accordingly, it is possible to remove the noise cancel circuits 64 from the averaging processing switches 2 and 3 to leave only the analog switch circuits 62. By doing so, it becomes possible to further decrease an element area.

As described above, according to the above embodiment, the image data can be averaged as the analog signals in the CMOS image sensor. Thus, since it becomes unnecessary to prepare a digital processing system and a storage device as an external device, design efficiency can be improved.

Besides, as the second CDS capacitance 51 used for the image averaging, a capacitance already existing in a chip can be used. For example, the capacitance of the input side or output side of first stage amplifiers 48, 48a and 48b of the CDS circuit 6CLn can be used. Accordingly, in the CMOS image sensor including the image averaging circuit according to the above embodiment, the increase in its area is only the size of the averaging processing switches 2, 3 and 21. Thus, as compared with a conventional CMOS image sensor requiring a logical portion and a storage portion, the chip area is largely reduced, manufacturing costs are suppressed, and the image averaging processing can be carried out.

Further, as compared with a case where averaging is not carried out, since averaging of image data increases an S/N (signal to noise) ratio by a factor of $1/\sqrt{2}$, it contributes to the improvement of picture quality.

The present invention is not limited to the foregoing embodiments, but various modifications can be made.

For example, in the embodiment, although the pixel region P has the APS structure constituted by one photoelectric transducer and three transistors, the invention is not limited to this, but can also be applied to another APS structure, for example, a CMOS image sensor in which a transfer gate and a FD (Floating Diffusion) region are provided and four or five transistors are disposed.

Figure 10:
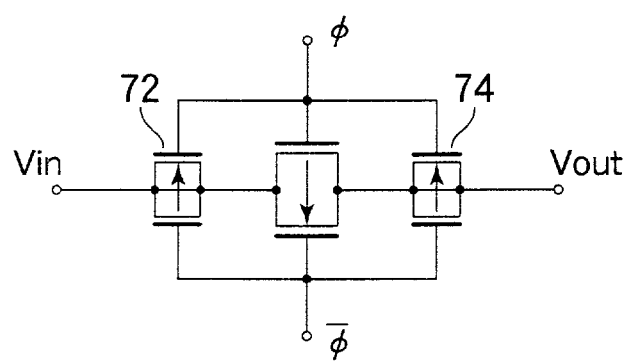
FIG. 10 is a view showing another structural example of an averaging processing switch 2, 3, 21a, or 21b in the fifth embodiment of the present invention.

Besides, in the above embodiment, although each of the averaging processing switches 2, 3, 21a and 21b is made to have the structure using the analog switch circuit 62 of the p-ch MOSFET and the two noise cancel circuits 64 of the p-ch MOSFETs for canceling the switching noise, the invention is not limited to this. For example, as shown in FIG. 10, an analog switch circuit 70 in which source electrodes of a p-ch MOSFET and an n-ch MOSFET are connected to each other and drain electrodes thereof are connected to each other, may be naturally used.

In this case, in order to cancel the switching noise of the input side of the analog circuit 70, a noise cancel circuit 72 is connected to the input side of the analog switch circuit 70. Besides, in order to cancel the switching noise of the output side of the analog switch circuit 70, a noise cancel circuit 74 is connected to the output side of the analog switch circuit 70. Each of the noise cancel circuits 72 and 74 is constructed by combining a p-ch MOSFET and an n-ch MOSFET respectively having a half element size of the p-ch MOSFET and the n-ch MOSFET of the analog switch circuit 70. Source electrodes and drain electrodes of the p-ch MOSFET and the n-ch MOSFET of the noise cancel circuit 72 are connected in common, and further, the source electrode is short-circuited to the drain electrode. The noise cancel circuit 74 has a similar connection structure.

A control signal $\phi$ of a predetermined voltage is applied to a gate electrode of the p-ch MOSFET of the analog switch circuit 70, and a control signal/$\phi$ is applied to a gate electrode of the n-ch MOSFET of the analog switch circuit 70. Gate electrodes of the p-ch MOSFETs of the noise cancel circuits 72 and 74 are connected to the gate electrode of the n-ch MOSFET of the analog switch circuit 70 in common, and gate electrodes of the n-ch MOSFETs of the noise cancel circuits 72 and 74 are connected to the gate electrode of the p-ch MOSFET of the analog switch circuit 70 in common.

By this, in the switching noises generated at the time of switching of the analog switch circuit 70, a noise component caused by a gate input capacitance of an input terminal side of the n-ch MOSFET of the analog switch circuit 70 is cancelled by a capacitance component of the p-ch MOSFET of the noise cancel circuit 72. Besides, a noise component caused by a gate input capacitance of an input terminal side of the p-ch MOSFET of the analog switch circuit 70 is cancelled by a capacitance component of the n-ch MOSFET of the noise cancel circuit 72.

Similarly, a noise component caused by a gate input capacitance of an output terminal side of the n-ch MOSFET of the analog switch circuit 70 is cancelled by a capacitance component of the p-ch MOSFET of the noise cancel circuit 74, and a noise component caused by a gate input capacitance of an output terminal side of the p-ch MOSFET of the analog switch circuit 70 is cancelled by a capacitance component of the n-ch MOSFET of the noise cancel circuit 74.

As described above, according to the present invention, it is possible to realize an X-Y address type solid-state image pickup device in which a chip area is not increased, manufacturing costs are suppressed, and an image averaging processing can be carried out.

What is claimed is:

1. An X-Y address type solid state image pickup device, comprising:
    a plurality of pixel regions arranged in a matrix form in regions defined by a plurality of horizontal selection lines and a plurality of vertical selection lines, wherein each pixel region including a photoelectric transducer for performing photoelectric conversion of incident light, an amplifier for converting an electric charge stored in the photoelectric transducer into image data, and a horizontal selection switch for outputting the image data to a predetermined one of vertical selection lines on the basis of a horizontal selection signal outputted to a predetermined one of horizontal selection lines;

a noise cancel circuit for removing a noise superimposed on the image data; and an image averaging circuit disposed in the noise cancel circuit for carrying out an averaging processing of the image data after the end of the noise cancel operation outputted from at least two of the plurality of pixel regions, wherein the noise cancel circuit includes, for each of the vertical selection lines, a correlated double sampling circuit in which an electric charge corresponding to the image data after removal of the noise is held in a first capacitance, and the image averaging circuit includes a first averaging processing switch for connecting a plurality of the first capacitances to average a plurality of the electric charges.

2. An X-Y address type solid-state image pickup device according to claim 1, wherein the image averaging circuit carries out the averaging processing of the image data of the plurality of pixel regions on the predetermined one of the horizontal selection lines.

3. An X-Y address type solid-state image pickup device according to claim 1 or 2, wherein the image averaging circuit carries out the averaging processing of the image data of the plurality of pixel regions on the predetermined one of the vertical selection lines.

4. An X-Y address type solid-state image pickup device according to claim 1, wherein the image averaging circuit includes a second capacitance inserted in parallel with the first capacitance in the correlated double sampling circuit.

5. An X-Y address type solid-state image pickup device according to claim 4, wherein the second capacitance is the capacitance of an input side or an output side of an amplifier provided in the correlated double sampling circuit.

6. An X-Y address type solid-state image pickup device according to claim 4, wherein the image averaging circuit includes a second averaging processing switch for electrically connecting/disconnecting the second capacitance to/from the correlated double sampling circuit.

7. An X-Y address type solid-state image pickup device according to claim 6, wherein the image averaging circuit includes a third averaging processing switch for electrically connecting/disconnecting the first capacitance to/from the correlated double sampling circuit.

8. An X-Y address type solid-state image pickup device according to claim 6, wherein the first averaging processing switches connect a plurality of the first and the second capacitances to average a plurality of the electric charges.

9. An X-Y address type solid-state image pickup device according to claim 8, wherein at least the first and the second averaging processing switches operate almost simultaneously to average the plurality of the electric charges.

10. An X-Y address type solid-state image pickup device according to claim 9, wherein the first and the second averaging processing switches include an analog switch circuit in which an n-ch MOSFET and a p-ch MOSFET are combined.

11. An X-Y address type solid-state image pickup device according to claim 9, wherein the first and the second averaging processing switches include an analog switch circuit made of either one of an n-ch MOSFET and a p-ch MOSFET.

12. An X-Y address type solid-state image pickup device according to claim 10 or 11, further comprising switching noise cancel circuits connected to an input side and an output side of the analog switch circuit to reduce switching noises of the analog switch circuit, the circuits being made of MOSFETs in which source electrodes are short-circuited to drain electrodes.

13. An X-Y address type solid-state image pickup device according to claim 12, wherein one of the switching noise cancel circuits has an approximately half size of the analog switch circuit.

* * * * *